United States Patent
Myneni et al.

(10) Patent No.: US 11,233,770 B2
(45) Date of Patent: Jan. 25, 2022

(54) USER BEHAVIOR BASED SECURITY IN A SOFTWARE DEFINED DATA CENTER

(71) Applicant: VMware, Inc., Palo Alto, CA (US)

(72) Inventors: Sirisha Myneni, Santa Clara, CA (US); Rajiv Mordani, Fremont, CA (US); Kausum Kumar, Los Gatos, CA (US)

(73) Assignee: VMWARE INC., Palo Alto, CA (US)

( * ) Notice: Subject to any disclaimer, the term of this patent is extended or adjusted under 35 U.S.C. 154(b) by 315 days.

(21) Appl. No.: 16/460,823

(22) Filed: Jul. 2, 2019

(65) Prior Publication Data

US 2021/0006542 A1 Jan. 7, 2021

(51) Int. Cl.
*H04L 29/06* (2006.01)

(52) U.S. Cl.
CPC ........ *H04L 63/0263* (2013.01); *H04L 63/102* (2013.01); *H04L 63/1433* (2013.01); *H04L 63/20* (2013.01)

(58) Field of Classification Search
CPC .............. H04L 63/0263; H04L 63/102; H04L 63/1433; H04L 63/20
See application file for complete search history.

(56) References Cited

U.S. PATENT DOCUMENTS

| | | | | |
|---|---|---|---|---|
| 8,353,021 | B1* | 1/2013 | Satish | H04L 63/0263 726/11 |
| 10,348,771 | B2* | 7/2019 | Kraemer | H04L 63/1441 |
| 10,904,277 | B1* | 1/2021 | Sharifi Mehr | H04L 63/1425 |
| 2008/0115190 | A1* | 5/2008 | Aaron | H04L 63/102 726/1 |
| 2011/0225650 | A1* | 9/2011 | Margolies | G06Q 10/06 726/22 |
| 2013/0061313 | A1* | 3/2013 | Cullimore | H04L 63/0209 726/13 |
| 2015/0281277 | A1* | 10/2015 | May | H04L 63/10 726/1 |
| 2016/0182556 | A1* | 6/2016 | Tatourian | H04L 67/02 726/25 |
| 2017/0134412 | A1* | 5/2017 | Cheng | H04L 67/2842 |
| 2018/0183827 | A1* | 6/2018 | Zorlular | H04L 63/1416 |
| 2018/0375884 | A1* | 12/2018 | Kopp | H04L 63/1425 |
| 2019/0260782 | A1* | 8/2019 | Humphrey | H04L 43/045 |
| 2019/0342286 | A1* | 11/2019 | Cobb | G06K 9/00892 |
| 2019/0349391 | A1* | 11/2019 | Elsner | G06K 9/6215 |
| 2020/0028862 | A1* | 1/2020 | Lin | H04L 63/1441 |
| 2020/0285737 | A1* | 9/2020 | Kraus | G06F 21/552 |

\* cited by examiner

*Primary Examiner* — Jason Chiang

(57) ABSTRACT

Behavior-based security in a datacenter includes monitoring user actions made by users in the datacenter. Behavior-based risk scores are computer for users based on their monitored actions. One or more firewall rules are generated for users based on their behavior-based risk scores. The firewall rules regulate the actions of the users.

12 Claims, 7 Drawing Sheets

| rule name | rule ID | source IP | destination IP | source port | destination port | protocol | cntxt 1 | cntxt 2 | ... | service(s) | action(s) |
|---|---|---|---|---|---|---|---|---|---|---|---|
| --- | 00 | --- | --- | --- | --- | --- | --- | --- | | --- | --- |
| --- | 01 | --- | --- | --- | --- | --- | --- | --- | | --- | --- |
| --- | 02 | --- | --- | --- | --- | --- | --- | --- | | | | firewall table, 302; 5-tuple; user contextual attributes, 306; rule, 304

FIG. 3 score table, 502

| user ID | $m_{fail}$ | $m_{file}$ | $m_{server}$ | $m_{network}$ | $m_{app}$ | $m_{process}$ | ... |
|---|---|---|---|---|---|---|---|
| user1 | 4 | 5 | 5 | 7 | 8 | 1 | |
| user2 | 1 | 2 | 0 | 0 | 4 | 3 | |
| ... | | | | | | | | behavior-based risk scores, 506 user records, 504

FIG. 5

USER BEHAVIOR BASED SECURITY IN A SOFTWARE DEFINED DATA CENTER

BACKGROUND

One of the major challenges in the modern datacenter is implementing security to protect against data theft and attacks to the system. A firewall is a system designed to prevent unauthorized access to a private network, such as in an enterprise. Firewalls can be implemented in either hardware or software, or a combination of both. Firewalls prevent unauthorized users from accessing enterprise networks from outside of the enterprise and from within the enterprise.

Firewalls commonly consist of a set policy rules based on a format sometimes referred to as the "5-tuple." The 5-tuple format refers to the five items that each rule in a firewall table uses to define whether to block or allow traffic: source IP (Internet protocol), destination IP, source port, destination port, and protocol. Each rule includes an associated action. For example, if a data packet matches a given rule, the action associated with the given rule can be to let the packet proceed unaffected, drop the data packet, route the data packet to a next hop location different from the one indicated by the data packet's destination IP, log the data packet, and so on.

The increasing connectivity that users in an enterprise have at their disposal for accessing the enterprise network presents a challenge to conventional 5-tuple rules. For example, users can connect to the enterprise network from various locations such as: internal LANs (local area networks), VDIs (virtual desktop infrastructures), via VPNs (virtual private networks), and so on. The user can be a corporate employee or even an external contractor. In some cases, the same user can login from different computers on different locations inside the same company campus. The source IP in a 5-tuple rule no longer can reliably serve to identify the user anymore. Firewall rule formats have evolved to address the challenge presented by the increasing options for connectivity. An example is the Vmware NSX® Identity™ firewall which uses policy rules that can be based on user membership or group membership, rather than relying on source IP to identify the user.

Despite improvements in firewall technology, datacenter security remains challenging as network attacks become more and more sophisticated and advanced, and can often by pass the typical security defenses. Hacked and spoofed credentials are often overlooked and are some of the primary reasons for data breaches in an enterprise. An increasing source of attacks are "insider attacks" where the attacker is already a trusted user within the enterprise; e.g., an employee, vendors, an outside contractor, officers of the enterprise, etc.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 3 illustrates an example of a firewall table.

FIG. 5 illustrates an example of a risk score table in accordance with some embodiments of the present disclosure.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
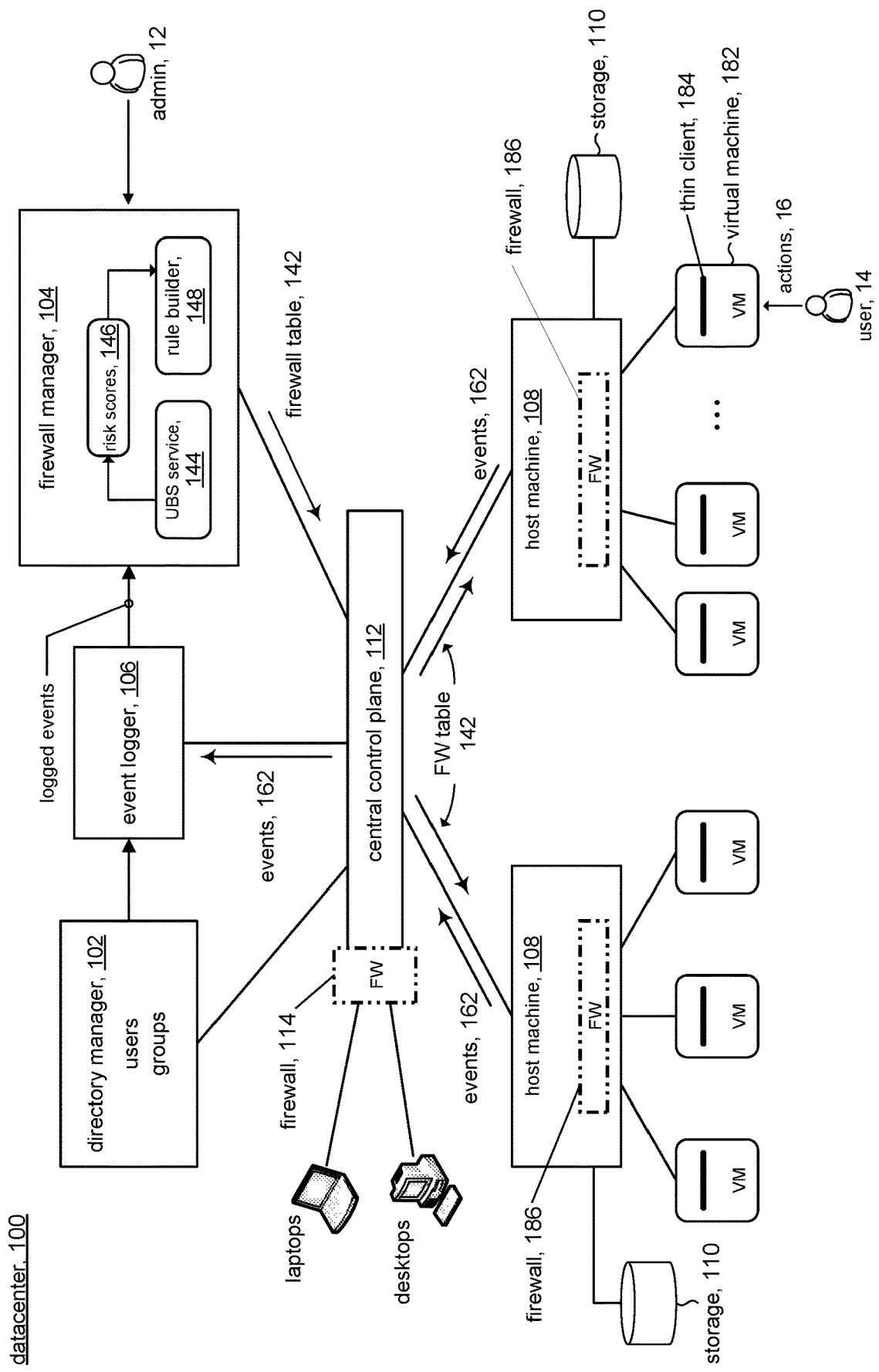
FIG. 1 shows a datacenter in accordance with the present disclosure.

FIG. 1 shows an illustrative system, datacenter 100, in accordance with the present disclosure. Datacenter 100 can include components such as a directory manager 102, a firewall manager 104, and an event logger 106. In some embodiments, for example, datacenter 100 can be a software-defined data center (SDDC), in which all elements of the infrastructure networking, storage, CPU and security, are virtualized and delivered as a service.

Directory manager 102 can provide tools for storing user directory data and making this data available to users and administrators in an enterprise (not shown). For example, directory manager 102 can store information about user accounts, such as names, passwords, phone numbers, and so on, and enables other authorized users to access this information. Directory manager 102 can also manage users in terms of groups; e.g., engineering groups, human resources groups, sales groups, and so on. In a particular embodiment, the functionality and services of directory manager 102 can be provided by Microsoft's Active Directory® services in their server operating systems.

Firewall manager 104 can provide functionality and services for developing, managing, and deploying firewalls in datacenter 100 to monitor incoming and outgoing network traffic and decide whether to allow or block specific traffic based on a defined set of security rules referred to as firewall table 142. The firewall table can be manually defined by a system administrator 12. In a particular embodiment, firewall manager 104 can be provided using the VMware NSX® Identity™ firewall functionality.

In accordance with the present disclosure, firewall manager 104 can include a user behavior scoring (UBS) service 144 to compute behavior-based risk scores 146 for users of the enterprise based on their activities in datacenter 100. Further in accordance with the present disclosure, firewall manager 104 can include a rule builder 148 to build rules based on the behavior-based risk scores computed by UBS service 144. In accordance with the present disclosure, rule building by rule builder can be an automated process. These aspects of the present disclosure are discussed in more detail below.

Event logger 106 can provide functionality for components (e.g., directory manager 102, host machines 108) in datacenter 100 to log or otherwise record user activity in the datacenter as events 162. In some embodiments, for example, event logger 106 can expose application programming interfaces (APIs, not shown) that the datacenter components can use to communicate with the event logger.

In some embodiments, datacenter 100 can include a virtualization environment to provide, deploy, and support virtual machines (VMs) for users in the enterprise. For example, datacenter 100 can include host machines 108 to provide VMs 182. VMs 182 can be configured as user machines, servers, and so on. Host machines 108 can be connected to respective storage systems 110 to provide virtualized data storage, e.g., for users, database applications, and so on. In a particular embodiment, host machines 108 can be VMware® ESXi™ host machines.

VMs 182 can include respective thin clients 184 to monitor and detect computer-related actions 16 performed by users (e.g., user 14) of the VMs. Users can be employees in the enterprise, vendors, outside contractors, and so on. Thin clients 184 can use the APIs exposed by event logger 106 to report user actions 16 as events 162 to the event logger. Actions 16 that can be reported as events 162 can include failed login attempts, accessing files and/or servers in the enterprise, accessing the network, installing software, executing processes, and the like.

Host machines 108 can include respective firewall engines 186 to allow or block VM traffic based on the security rules that comprise firewall table 142, defined and managed by firewall manager 104. In some embodiments, firewall manager 104 can push firewall table 142 to firewall engine 186 in each host machine 108. In some embodiments, firewall manager 104 can configure individualized firewall policies that are customized for each host machine 108. For example, a host machine that supports the human resources group in the enterprise may require a firewall with higher security rules than for a host machine that supports vendors of the enterprise. For discussion purposes, however, the single-firewall table embodiment can be used in this disclosure without loss of generality.

Central control plane 112 can coordinate the various components that comprise datacenter 100. For example, central control plane 112 can coordinate communication between VMs 182 and directory manager 102 to provide services for logging a user onto the system; e.g., password verification. The central control plane can coordinate with firewall manager 104 to push firewall table 142 to be installed rules in the firewall engines of host machines 108.

Central control plane 112 can also provide connectivity for computing devices such laptops, desktop systems, and wireless devices (not show) in addition to host machines 108. Central control plane 112 can include firewall engine 114 for these additional computing devices. Similar to firewall engines 186 in the VMs, firewall table 142 can be pushed to firewall engine 114.

Figure 2:
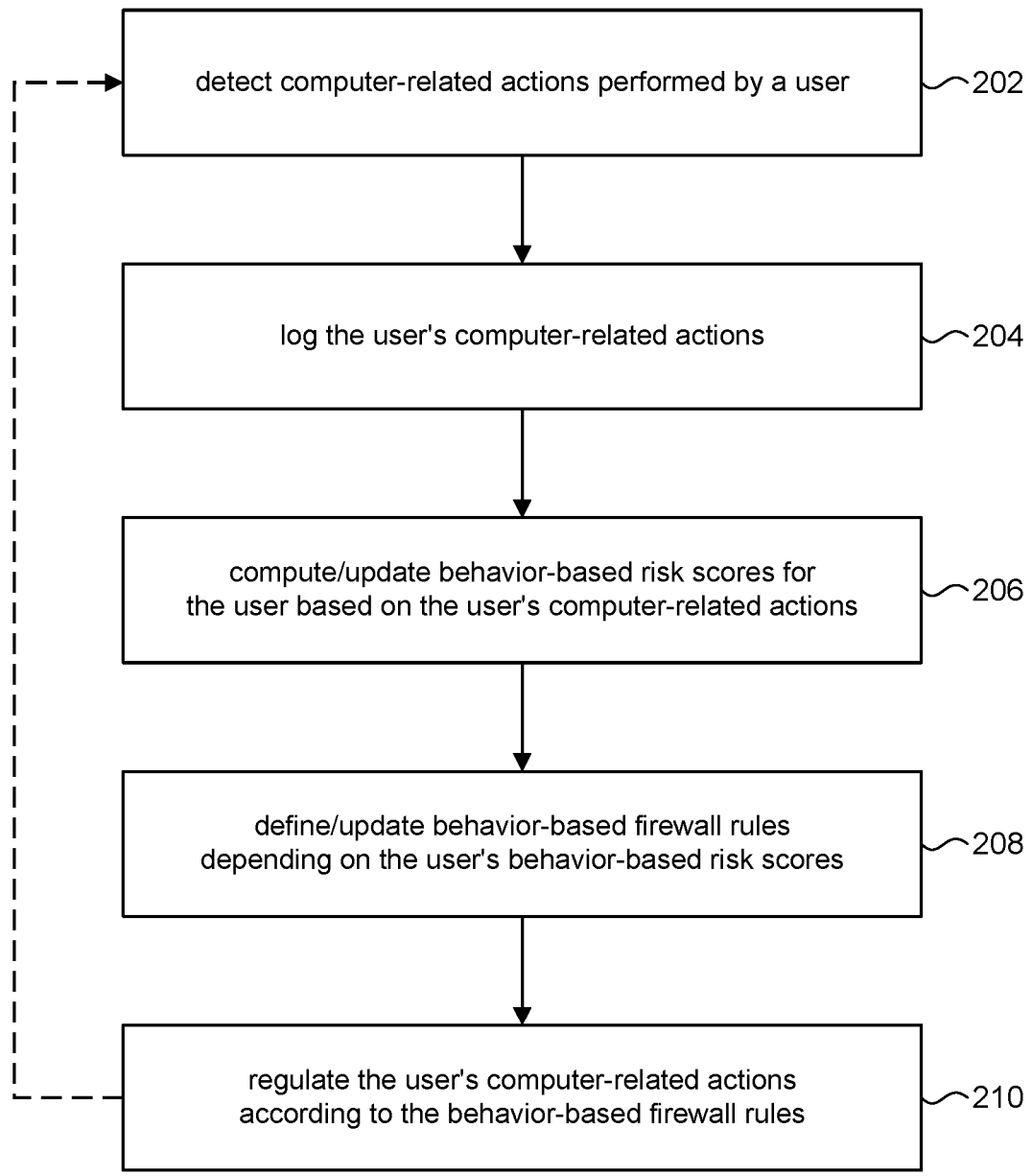
FIG. 2 is a high level representation of processing in accordance with the present disclosure.

Referring to FIG. 2, the discussion will now turn to a high level description of processing in datacenter 100 in accordance with the present disclosure. In some embodiments, for example, datacenter 100 may include computer executable program code, which when executed by one or more computers (e.g., 712, FIG. 7) comprising datacenter 100, can cause the one or more computers to perform the processing in accordance with FIG. 2. The flow of operations performed by the one or more computers is not necessarily limited to the order of operations shown.

At operation 202, datacenter 100 can detect computer-related actions performed by a user. Referring to FIG. 1, for example, in some embodiments, thin client 184 in each VM 182 can detect user actions. Although not shown in FIG. 1, similar functionality can be provided in central control plane 112 to detect computer-related actions performed by users of computing devices such as laptops and desktop systems. Events 162 can be reported by any component in the datacenter. For example, directory manager 102 can log events such as creation/deletion of users, groups, etc. Users' computer-related actions can include failed login attempts, accessing files, accessing servers in the enterprise, accessing the network, installing software, executing processes.

At operation 204, datacenter 100 can log the user's computer-related actions. Referring to FIG. 1, for instance, in some embodiments, the user's actions can be reported to event logger 106 as events 162. On a VM, for example, the thin client can monitor a user's activity. The thin client can report various actions as events 162 to the event logger. In some embodiments, for example, the client can include information that identifies the user who performed the computer-related action and information about the action itself. For example, if the action is a failed login attempt, the thin client can report the username that was used and where the login was attempted from (e.g., host machine, laptop, etc.). If the action is accessing a file or a server, the thin client can report the location/name of the file or server being accessed along with attributes of the file or server (e.g., required access level, protections, etc.). If the action is accessing the network, the thin client can report the destination (e.g., IP address) of the network access. If the action is installing software (e.g., an application, a driver, an update, etc.), the thin client can report the name of the software and other details. If the action is executing a process, the thin client can report the name of the process (e.g., process "xyz.exe").

The event logger can record each event 162 in a suitable log file such as an event log (not shown). Such information can analyzed and monitored to assess network security. An event log can capture many different types of information; for example, an event log can capture all logon sessions to a network, along with account lockouts, failed password attempts, etc. An event log can also record different types of application events, such as application errors, closures or other related events.

At operation 206, datacenter 100 can compute or update the user's behavior-based risk score based on the logged events. In some embodiments, for example, event logger 106 can signal UBS service 144 in firewall manager 104 when an event is logged for the user. The UBS service can update an existing behavior-based risk score 146 for the user (or create a new one) based on the logged event reported by the event logger. This aspect of the present disclosure is discussed in more detail below.

At operation 208, datacenter 100 can autonomously define or update one or more behavior-based firewall rules for the user based on the user's behavior-based risk scores, absent user interaction (e.g., without input from a user). In some embodiments, for example, rules builder 148 can be signaled by UBS service 144 each time the UBS service computes a new score for the user. In response, rules builder 148 can update one or more behavior-based firewall rules associated with the user using the user's behavior-based risk scores. In other embodiments, the rules builder can act independently of the UBS service, and periodically scan the datastore of behavior-based risk scores 146 for all users and update those users' behavior-based firewall rules as needed. It is noted that process of building behavior-based firewall rules can be performed as an automated background process by rules builder 148 absent any interaction or input from a human user such as administrator 12. This provides for a dynamic rule building process that can constantly monitor user activity and respond immediately to the occurrence user activity that is deemed harmful to the security of the datacenter by building rules to quarantine users from the datacenter.

At operation 210, datacenter 100 can regulate the user's computer-related actions according the behavior-based firewall rules associated with the user. In some embodiments, for example, the behavior-based firewall rules can be included with firewall rules comprising firewall table 142. Firewall manager 104 can push the updated firewall table to firewall engines 186, 114 throughout the datacenter. Processing can return to operation 202 to continually monitor users' activities and update the firewall table based on the users' activities, thus allowing the firewall manager to react to changing security conditions as soon as they occur.

Referring to FIG. 3, details of a firewall table 302 are described. In some embodiments, for example, firewall table 302 can comprise a table of firewall (access) rules 304. A firewall engine (e.g., 186) uses one ore more firewall rules 304 to identify network traffic and to allow or block the flow of certain network traffic. Each firewall rule 304 can be identified by a rule name, which can be an alpha-numeric value suitable for human users for purposes of managing the firewall rules, and by a rule ID (e.g., a numerical value), which is suitable for a computer.

Firewall rules 304 can include the so-called 5-tuple comprising source and destination IP addresses, source and destination ports, and a protocol. A firewall rule can identify data flows based on the source location (e.g., source IP) of the data flow. In some embodiments, for example, the source IP field in a firewall rule can identify the source IP address (e.g., a VM) of the data flow. Likewise, the destination IP field in a firewall rule can identify the destination (e.g., via IP address) of the data flow. Thus, a packet having a destination IP address that matches the destination IP field in a firewall rule will trigger the rule to process the packet according to the corresponding action.

In some embodiments, firewall rules 304 can identify data flows based on the user whose action triggered the data flow. Accordingly, in some embodiments, firewall rules can include user contextual attributes. In some embodiments, for example, contextual attributes associated with the user can be collected, such as user login information, user privileges, information about processes instantiated by the user, and so on. Contextual attributes can also include process information for processes associated with the user during the user's session. Firewall rules 304 can include fields to match these such contextual attributes. A firewall rule that matches one or more of these contextual attributes can serve to trigger the corresponding action.

Referring to FIGS. 1 and 3, firewall engine 186 in a host machine can process the firewall table 302 to restrict the actions of a user on a VM instantiated on the host machine. For example, firewall engine 186 can do a look up in the firewall table on a per flow basis to associating the user/process information with the context. Firewall table 302 includes columns 306 for matching on the context in addition to the 5-tuple information thereby allowing us to program based on the calculated user risk score.

For discussion purposes, the firewall rules 304 comprising firewall table 302 may be categorized as follows. Firewall rules that are manually created, e.g., by a system administrator, may be referred to herein as "policy" firewall rules. Firewall rules that are automatically generated by rules builder 148 may be referred to herein as "behavior-based" firewall rules. Firewall rules that are associated with a group (e.g., engineering group, marketing group, sys admin group, etc.) may be referred to herein as "identity based" firewall rules, meaning that the firewall rules apply to all users in a given group.

Figure 4:
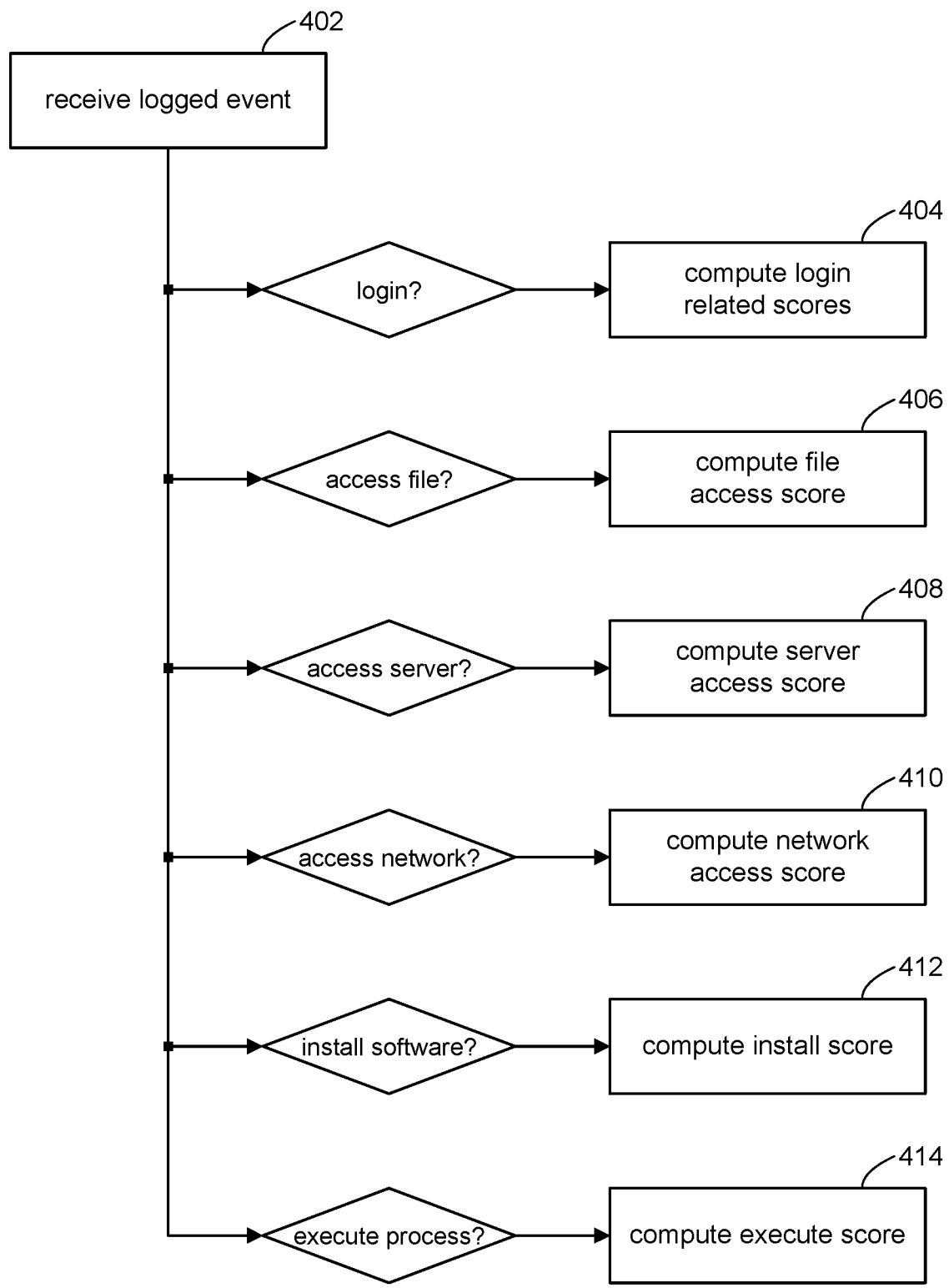
FIG. 4 is a high level representation of computing behavior-based risk scores in accordance with the present disclosure.

Referring to FIG. 4, the discussion will now turn to a high level description of processing in UBS service 144 to compute behavior-based risk scores 146 in accordance with the present disclosure. In some embodiments, for example, the processing may be provided by computer executable program code, which when executed by one or more computers (e.g., 712, FIG. 7) in datacenter 100, can cause the one or more computers to perform the processing in accordance with FIG. 4. The flow of operations performed by the one or more computers is not necessarily limited to the order of operations shown.

At operation 402, UBS (user behavior scoring) service 144 can receive a logged event. In some embodiments, for example, event logger 106 can send a logged event to the UBS service component of firewall manager 104. The logged event can include information that identifies the user involved in the logged event and the type of the event that was logged. In response, the UBS service can compute a behavior-based risk score based on the received logged event. In some embodiments, the user can be associated with several behavior-based risk scores. The risk scores can be maintained in a table. Referring for a moment to FIG. 5, for example, a risk score table 502 comprising user records 504 can store behavior-based risk scores 506 for users whose behavior over time have resulted in generating one or more risk scores. In some embodiments, for example, types of events and corresponding risk scores 506 can include failed login attempts ($m_{fail}$), access to a file ($m_{file}$) or a server ($m_{server}$), a network access ($m_{network}$), installation of software ($m_{app}$), execution of a process ($m_{process}$), and so on. The UBS service can process the received logged event to compute or update a behavior-based risk score for the user according to the event type.

At operation 404, UBS service 144 can compute or otherwise update scores related to login events. For example, a failed-login risk score, $m_{fail}$, can represent a user's failed login attempts. Generally, each occurrence of a failed login (e.g., incorrect password) by a user can result in increasing the failed login risk score. For example, the failed login risk score may initially be set to zero, and increase according to an algorithm when failed login attempts are detected. In some embodiments, for example, the algorithm can increment the user's failed login risk score by one for each failed login attempt; e.g., $m_{fail}$+=1. It will be appreciated that any suitable algorithm can be used to increment the failed login risk score. For example, the algorithm may allow for some number of failed attempts before incrementing the failed login risk score, for instance, to accommodate for inadvertently mistyped passwords. The increment amount may increase over time, the risk score may be reset to zero after the passage of some amount of time, and so on.

Other login events can include login attempts to highly protected user accounts, which are accounts that are associated with high risk. The directory manager 102, for example, can maintain information about protection attributes for every user account. Protected accounts can include, for example, user accounts for high level officers in an enterprise such as the CEO, financial officers, human resource manager, etc. Protected accounts may be defined based on user groups; e.g., an engineering group may be deemed to be a protected group. Users of protected accounts can be deemed high risk, for example, because they may have greater access to resources of the enterprise than other users. Accordingly, in some embodiments, specific risk scores can be associated with these protected users. For example, failed login attempts made by protected users may be tracked with a separate risk score than non-protected users.

At operation 406, UBS service 144 can compute or otherwise update a file access risk score, $m_{file}$, that represents a user's attempt to access the enterprise's data files. Files may be associated with vulnerability ratings. For example, human resources (HR) files may have a high vulnerability rating to reflect the fact that the information contained in those files are highly sensitive, while files in the marketing groups may not lower vulnerability ratings, and so on. Vulnerability ratings may be determined based on the type of user (e.g., sales, HR, engineering, vendor, etc.) and the type of file that is accessed. For example, an engineering user who is accessing an HR file may yield a very high vulnerability rating, whereas an engineering user who is accessing an engineering document may yield a low (or even zero) vulnerability rating. Generally, each occurrence of a file access by a user can result in increasing the file access risk score, which can be initially set to zero, according to an algorithm. In some embodiments, for example, the algorithm can increment the user's file access risk score according to: $m_{file}$+=file vulnerability rating. In some embodiments, specific risk scores can be defined for accesses to files made by protected users.

At operation 408, UBS service 144 can compute or otherwise update a server access risk score, $m_{server}$, that represents a user's access attempt to servers in the enterprise. As with files, different servers in the enterprise may be associated with a vulnerability rating. Generally, each occurrence of a server access by a user can result in increasing the server access risk score, for example according to $m_{server}$+=server vulnerability rating. In some embodiments, specific risk scores can be defined for accesses to servers made by protected users.

At operation 410, UBS service 144 can compute or otherwise update a network access risk score, $m_{network}$, that represents a user's access attempt to the network. Network access can refer to accessing the network other than to access files or servers in the enterprise. In some embodiments, for example, certain known IP addresses can be flagged as being high risk; a corresponding vulnerability rating can be associated with such addresses. In some embodiments, the accessed web page can be analyzed to assess vulnerability to the enterprise and a corresponding vulnerability score can be computed/assigned based on the assessment. Generally, each occurrence of a network access by a user can result in increasing the network access risk score. In some embodiments, for example, an algorithm can increment the user's network access risk score according to: $m_{network}$+=network vulnerability rating. In some embodiments, specific risk scores can be defined for network accesses made by protected users.

At operation 412, UBS service 144 can compute or otherwise update an app risk score, $m_{app}$, that represents a user's access attempt to install software (e.g., applications, drivers, updates). In some embodiments, a database (not shown) can be used to track known malicious software and to provide a corresponding vulnerability rating. In some embodiments, a public registry of known malicious software can be used. Generally, each occurrence of an attempt to install software by a user can result in increasing the app risk score according to a suitable algorithm. In some embodiments, for example, the algorithm can increment the user's app risk score according to: $m_{app}$+=software vulnerability rating.

At operation 414, UBS service 144 can compute or otherwise update a process risk score, $m_{process}$, that represents a user's access attempt to execute processes. In some embodiments, certain processes can be identified as being vulnerable. Similar to identifying high risk software, a database (not shown) can be used to track high risk processes and to provide a corresponding vulnerability rating. For instance, when the WannaCry ransomware attack occurred on Microsoft® operating systems, Microsoft recommended disabling any SMBv1 protocol-related processes from running on a machine. In accordance with the present disclosure, such processes can be tagged as high risk because they would be vulnerable to the ransomware. Generally, each occurrence of an attempt to execute a process by a user can result in increasing the process risk score. In some embodiments, for example, an algorithm can increment the user's process risk score according to: $m_{process}$+=process_vulnerability_rating.

It will be appreciated that other risk scores can be defined. For example, in some embodiments, risk scores can be based on user access patterns such login/logout times, where does the user login from (the office, home, somewhere else), and so on. Risk scores can be based on deviations from the pattern. For example, a pattern may be established whereby a user rarely logs in from home on the weekend. If the user's login pattern shows an increase of logins on the weekend from a place other than the home or office, a corresponding risk score can be used to flag the activity.

Figure 6:
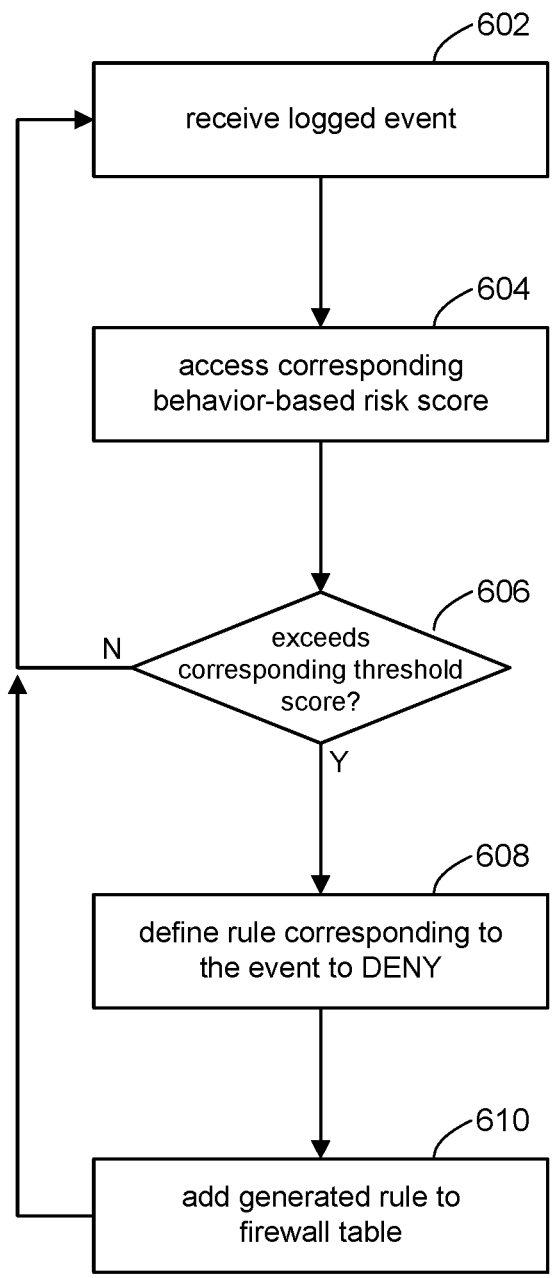
FIG. 6 is a high level representation of automatically defining a behavior-based rule in accordance with the present disclosure.

Referring to FIG. 6, the discussion will now turn to a high level description of processing in rule builder 148 to generate behavior-based rules in accordance with the present disclosure. In some embodiments, for example, the processing may be provided by computer executable program code, which when executed by one or more computers (e.g., 712, FIG. 7) in datacenter 100, can cause the one or more computers to perform the processing in accordance with FIG. 6. The flow of operations performed by the one or more computers is not necessarily limited to the order of operations shown.

At operation 602, rule builder 148 can receive a logged event. In some embodiments, for example, event logger 106 can send a logged event to the rule builder component of firewall manager 104. The logged event can include information that identifies the user involved in the logged event and the type of the event that was logged.

At operation 604, rule builder 148 can access the user's behavior-based risk score that corresponds to the type of event in the received logged event; e.g., from score table 502.

At operation 606, rule builder 148 can determine whether to build a rule based on the user's behavior-based risk score. In some embodiments, for example, the rule builder can maintain a threshold score for each type of event. For example, there can be a threshold risk score for failed login events, a threshold risk score for file access events, and similar threshold scores for server access events, network access events, software install events, process execution events, and so on. If the user's behavior-based risk score for the type of event in the received logged event exceeds the corresponding threshold score, then the user's behavior in connection with this type of event can be deemed suspicious, or risky, etc, and warrants some degree of quarantine action. Accordingly, processing can proceed to operation 608. Otherwise, processing can return to operation 602 to process the next received logged event.

At operation 608, rule builder 148 can define a behavior-based firewall rule corresponding to the type of event in the received logged event. For example:

failed login events—A firewall rule can be defined that specifies the user (e.g., in the source field of the rule) for login events and can be associated with the action of DENY. Thus, users having a failed login risk score $m_{fail}$ that exceeds the failed login threshold would be denied login access.

file access event—A firewall rule can be defined that specifies one or more files and is associated with the action of DENY. Thus, users having a file risk score $m_{file}$ that exceeds the file risk threshold would be denied access to the specified file(s).

server access event—A firewall rule can be defined that specifies one or more servers and is associated with the action of DENY. Thus, users having a server risk score $m_{server}$ that exceeds the server risk threshold would be denied access to the specified server(s).

network access event—A firewall rule can be defined that specifies one or more IP addresses and is associated with the action of DENY. Thus, users having a network risk score $m_{network}$ that exceeds the network risk threshold would be denied access to the specified IP address(es).

software install event—A firewall rule can be defined that specifies one or more applications, drivers, and/or update packages and is associated with the action of DENY. Thus, users having an app risk score $m_{app}$ that exceeds the app risk threshold would be prevented from installing the software.

process execute event—A firewall rule can be defined that specifies one or more processes and is associated with the action of DENY. Thus, users having a process risk score $m_{process}$ that exceeds the process risk threshold would be prevented from executing the process.

At operation 610, rule builder 148 can insert the generated behavior-based firewall rule into firewall table 142. When the firewall table is subsequently distributed (pushed) to host machines 108 and installed in their respective firewall engines 186, the user's actions can be regulated according to the behavior-based firewall rule. In some embodiments, firewall table 142 can be pushed each time a new behavior-based rule is generated. In other embodiments, firewall table 142 can be pushed on a periodic basis (e.g., every 30 minutes). Processing can return to operation 602 to receive and process the next logged event.

Figure 7:
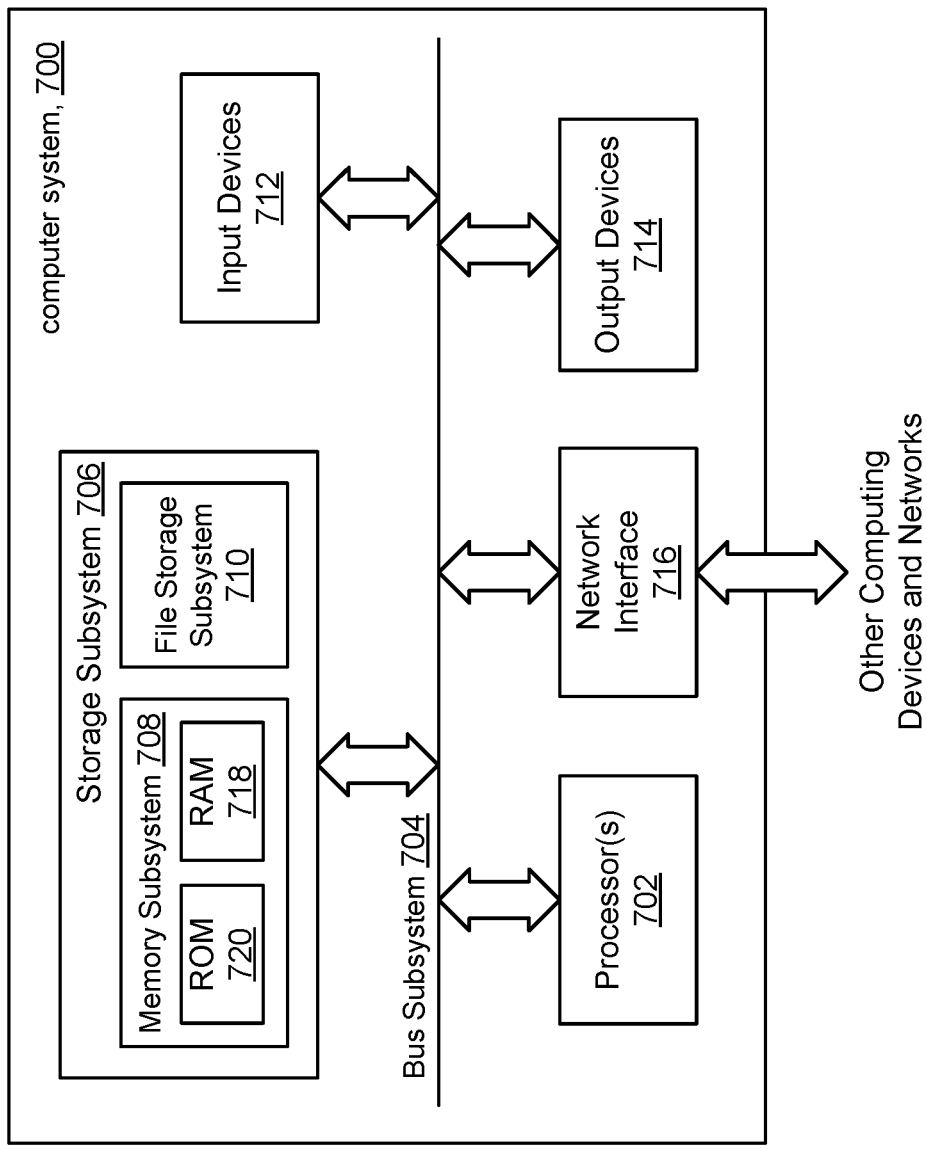
FIG. 7 is a high level block diagram of a computer system used in a datacenter in accordance with the present disclosure.

FIG. 7 depicts a simplified block diagram of an example computer system 700 according to certain embodiments. Computer system 700 can be used to in datacenter 100 described in the present disclosure, for example in host machines 108, firewall manager 104, even logger 106, and so on. As shown in FIG. 7, computer system 700 includes one or more processors 702 that communicate with a number of peripheral devices via bus subsystem 704. These peripheral devices include storage subsystem 706 (comprising memory subsystem 708 and file storage subsystem 710), user interface input devices 712, user interface output devices 714, and network interface subsystem 716.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple busses.

Network interface subsystem 716 can serve as an interface for communicating data between computer system 700 and other computer systems or networks. Embodiments of network interface subsystem 716 can include, e.g., an Ethernet card, a Wi-Fi and/or cellular adapter, a modem (telephone, satellite, cable, ISDN, etc.), digital subscriber line (DSL) units, and/or the like.

User interface input devices 712 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 700.

User interface output devices 714 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 700.

Memory subsystem 706 includes memory subsystem 708 and file/disk storage subsystem 710 represent non-transitory computer-readable storage media that can store program code and/or data, which when executed by processor 702, can cause processor 702 to perform operations in accordance with embodiments of the present disclosure.

Memory subsystem 708 includes a number of memories including main random access memory (RAM) 718 for storage of instructions and data during program execution and read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and many other configurations having more or fewer components than system 700 are possible.

CONCLUSION

Behavior-based rules can provide more accurate data and system security by taking into account behavioral aspects of users of a datacenter in order to detect malicious behavior. Embodiments in accordance with the present disclosure provide an automated rule generating process that simplifies the task of constantly monitoring the activities of every user of a datacenter and create/revise firewall rules based on the monitored activity. Embodiments in accordance with the present disclosure represent a practical application to dynamically create/revise firewall rules as soon as risky behavior in a user is detected and thus provide faster times to respond to potential attacks to the datacenter than is practically possible by human users.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
   detecting, by one or more computers, computer-related actions performed by a user;
   logging, by one or more of the computers, a logged event that includes the user's detected computer-related actions and the user that performed the detected computer-related actions;
   computing, by one or more of the computers, one or more behavior-based risk scores for the user based on the user's computer-related actions;
   receiving, by a rule builder, the logged event;
   building, by the rule builder, one or more new behavior-based firewall rules for each different type of detected computer-related action by the user wherein the one or more new behavior-based firewall rules are based on the detected computer-related actions included in the logged event and the one or more behavior-based risk scores for the user;
   inserting, by the rule builder, the one or more new behavior-based firewall rules into a firewall table;
   periodically updating the user's one or more behavior-based risk scores as additional computer-related actions by the user are detected and logged;
   updating the user's one or more behavior-based firewall rules by deleting previously built behavior-based firewall rules and building new behavior-based firewall rules based on the user's updated one or more behavior-based risk scores;
   regulating, by one or more of the computers, the user's computer-related actions according to at least the one or more new behavior-based firewall rules inserted into the firewall table.

2. The method of claim 1, wherein the one or more behavior-based risk scores include one or more of a risk score associated with failed login attempts, of a risk score associated with accessing files, of a risk score associated with accessing servers in the enterprise, of a risk score associated with accessing the network, of a risk score associated with installing software, and of a risk score associated with executing processes.

3. The method of claim 1, wherein the user's computer-related actions are associated with corresponding vulnerability ratings, wherein the user's one or more behavior-based risk scores are computed using the vulnerability ratings corresponding to the user's computer-related actions.

4. The method of claim 1, wherein regulating the user's computer-related actions includes at least one of allowing or denying the user from logging onto a computer system, allowing or denying the user access to a file or a server, allowing, denying, or redirecting a destination of a network access, allowing or denying the user from installing software, and allowing or denying execution of a process.

5. A non-transitory computer-readable storage medium having stored thereon computer executable instructions, which when executed by a computer device, cause the computer device to:
   detect computer-related actions performed by a user;
   log the user's computer-related actions as a logged event that includes the user's detected computer-related actions and the user that performed the detected computer-related actions;
   compute one or more behavior-based risk scores for the user based on the user's computer-related actions;
   receive, by a rule builder, the logged event;
   build, by the rule builder, one or more new behavior-based firewall rules for each different type of detected computer-related action by the user wherein the one or more new behavior-based firewall rules are based on the detected computer-related actions included in the logged event and the one or more behavior-based risk scores for the user;
   insert, by the rule builder, the one or more new behavior-based firewall rules into a firewall table;
   periodically updating the user's one or more behavior-based risk scores as additional computer-related actions by the user are detected and logged;
   updating the user's one or more behavior-based firewall rules by deleting previously built behavior-based firewall rules and building new behavior-based firewall rules based on the user's updated one or more behavior-based risk scores;
   regulate the user's computer-related actions according to at least the one or more new behavior-based firewall rules inserted into the firewall table.

6. The non-transitory computer-readable storage medium of claim 5, wherein the one or more behavior-based risk scores include one or more of a risk score associated with failed login attempts, of a risk score associated with accessing files, of a risk score associated with accessing servers in the enterprise, of a risk score associated with accessing the network, of a risk score associated with installing software, and of a risk score associated with executing processes.

7. The non-transitory computer-readable storage medium of claim 5, wherein the user's computer-related actions are associated with corresponding vulnerability ratings, wherein the user's one or more behavior-based risk scores are computed using the vulnerability ratings corresponding to the user's computer-related actions.

8. The non-transitory computer-readable storage medium of claim 5, wherein regulating the user's computer-related actions includes at least one of allowing or denying the user from logging onto a computer system, allowing or denying the user access to a file or a server, allowing, denying, or redirecting a destination of a network access, allowing or denying the user from installing software, and allowing or denying execution of a process.

9. An apparatus comprising:
   one or more computer processors; and
   a computer-readable storage medium comprising instructions for controlling the one or more computer processors to be operable to:
   detect computer-related actions performed by a user;
   log the user's computer-related actions as a logged event that includes the user's detected computer-related actions and the user that performed the detected computer-related actions;
   compute one or more behavior-based risk scores for the user based on the user's computer-related actions;
   receive, by a rule builder, the logged event;
   build, by the rule builder, one or more new behavior-based firewall rules for each different type of detected computer-related action by the user wherein the one or more new behavior-based firewall rules are based on the detected computer-related actions included in the logged event and the one or more behavior-based risk scores for the user;

insert, by the rule builder, the one or more new behavior-based firewall rules into a firewall table;

periodically updating the user's one or more behavior-based risk scores as additional computer-related actions by the user are detected and logged;

updating the user's one or more behavior-based firewall rules by deleting previously built behavior-based firewall rules and building new behavior-based firewall rules based on the user's updated one or more behavior-based risk scores;

regulate the user's computer-related actions according to at least the one or more new behavior-based firewall rules inserted into the firewall table.

10. The apparatus of claim 9, wherein the user's computer-related actions are associated with corresponding vulnerability ratings, wherein the user's one or more behavior-based risk scores are computed using the vulnerability ratings corresponding to the user's computer-related actions.

11. The apparatus of claim 9, wherein the one or more behavior-based risk scores include one or more of a risk score associated with failed login attempts, of a risk score associated with accessing files, of a risk score associated with accessing servers in the enterprise, of a risk score associated with accessing the network, of a risk score associated with installing software, and of a risk score associated with executing processes.

12. The apparatus of claim 9, wherein the computer-readable storage medium further comprises instructions for controlling the one or more computer processors to be operable to regulate the user's computer-related actions includes at least one of allowing or denying the user from logging onto a computer system, allowing or denying the user access to a file or a server, allowing, denying, or redirecting a destination of a network access, allowing or denying the user from installing software, and allowing or denying execution of a process.

* * * * *